No. 847,460. PATENTED MAR. 19, 1907.
R. BLEITZ.
SPEED CHANGING MECHANISM.
APPLICATION FILED JAN. 5, 1907.

Attest:
John Enders
Henry Moe

Inventor:
Rollen Bleitz,
by Robert Burns
Attorney.

UNITED STATES PATENT OFFICE.

ROLLEN BLEITZ, OF SANDWICH, ILLINOIS, ASSIGNOR OF ONE-HALF TO LOUIS BLEITZ, OF SANDWICH, ILLINOIS.

SPEED-CHANGING MECHANISM.

No. 847,460.        Specification of Letters Patent.        Patented March 19, 1907.

Application filed January 5, 1907. Serial No. 350,875.

*To all whom it may concern:*

Be it known that I, ROLLEN BLEITZ, a citizen of the United States of America, and a resident of Sandwich, in the county of Dekalb and State of Illinois, have invented certain new and useful Improvements in Speed-Changing Mechanisms, of which the following is a specification.

This invention relates to that type of speed-changing mechanisms in which a pair of friction members are arranged in angular relation, with one of said members made adjustable to and from the axis of rotation of the other member to afford the desired variation in the speed of the driven shaft; and the present improvement has for its objects to provide a simple and efficient arrangement of parts whereby when a high speed is required the driving and driven shafts are coupled in a direct manner and the intermediate friction mechanism thrown entirely out of gear and also provide a simple and effective structural formation and combination of parts adapted to afford a reverse motion of the driven shaft of the present friction type of speed-changing mechanisms, all as will hereinafter more fully appear.

Figure 1:
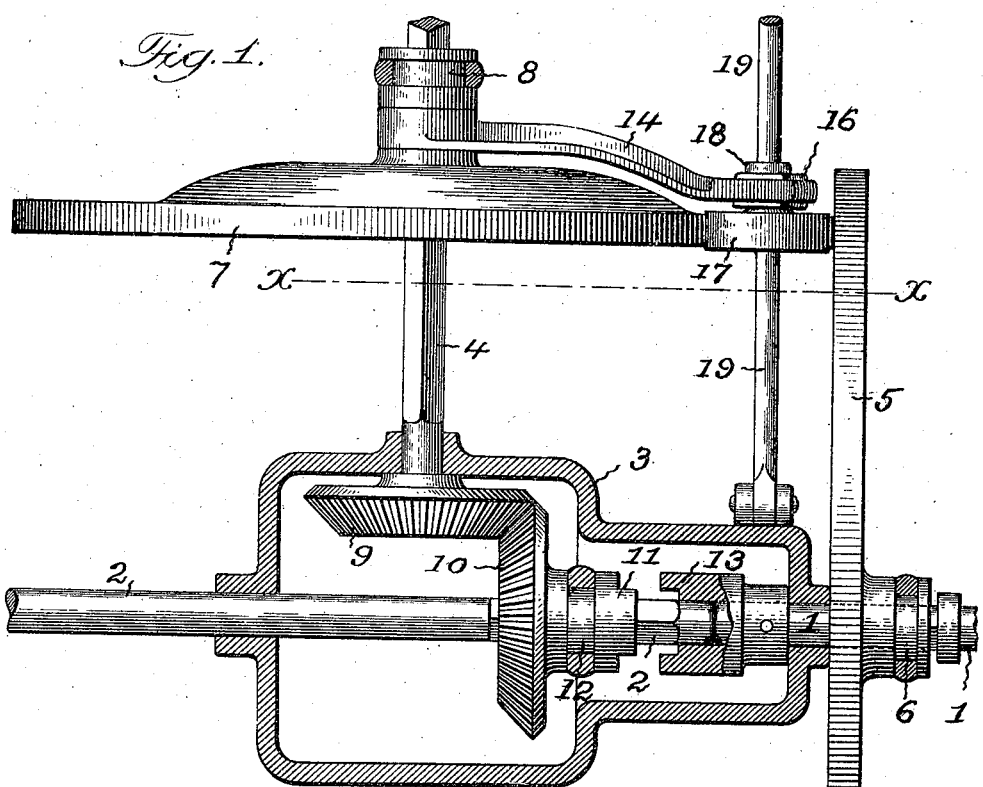
Figure 3:
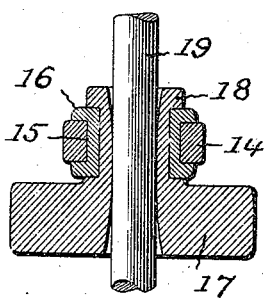
Figure 2:
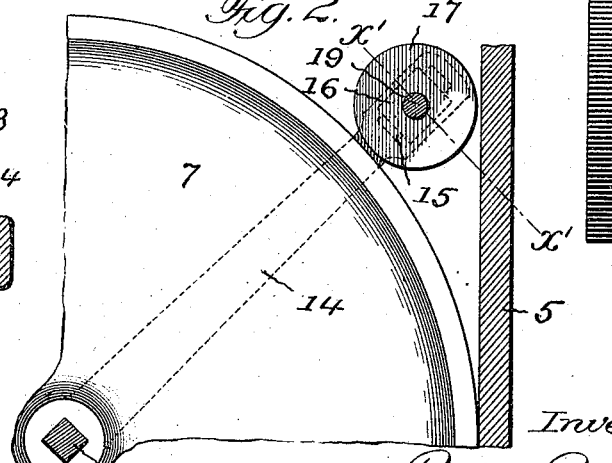

In the accompanying drawings, Figure 1 is a sectional elevation of a speed-changing mechanism embodying the present improvements. Fig. 2 is a detail section on line *x x*, Fig. 1. Fig. 3 is an enlarged detail section on line *x' x'*, Fig. 2.

Similar numerals of reference indicate like parts in the several views.

Referring to the drawings, 1 and 2 are the driving and driven shafts, respectively, of the present mechanism, arranged in axial alinement and having journal-bearings in the housing 3 of the mechanism, as shown, the proper axial alinement of the adjacent ends of the two shafts being maintained by the hub portion of one member of the hereinafter-described clutch.

4 is a counter-shaft arranged in right-angle relation to the aforesaid driving and driven shafts and having a bearing in the housing 3 aforesaid.

5 is a friction-disk carried by the driving-shaft 1 and preferably having a limited axial adjustment thereon by means of a suitably-arranged lever operatively engaging a peripheral channel 6, formed in the hub portion of said disk, as shown, and with a view to either increase or wholly remove the frictional engagement between said disk and the driven disk, as hereinafter more fully set forth.

7 is the driven friction-disk having an axial adjustment upon a non-circular part of the counter-shaft 4 by means of a suitably-arranged lever operatively engaging a peripheral channel 8 in the hub portion of said disk.

9 is a bevel-gear secured to the end of the counter-shaft within the housing 3 aforesaid.

10 is a companion bevel-gear carried by the driven shaft 2 and meshing with the bevel-gear 9 to receive motion therefrom.

In the present improvement the bevel-gear 10 is formed with a clutch member 11 of any usual form at one end of the hub portion, and said bevel-gear, as well as its clutch member, has an axial adjustment upon a non-circular portion of the driven shaft 2 by means of a suitably-arranged lever having operative engagement with a peripheral channel 12 in the hub portion of said bevel-gear. The arrangement of said parts is such that with an adjustment in one direction the two bevel-gears will be in mesh to transmit the variable speed of the friction-disk 7 and its counter-shaft 4 to the driven shaft 2, and with an adjustment in the other direction the bevel-gear 10 first moves out of mesh with the bevel-gear 9, after which its clutch member 11 moves into engagement with a corresponding clutch member 13, secured to the end of the driving-shaft 1 within the housing 3, so as to transmit the motion of said driving-shaft to the driven shaft in a direct manner and leaving the change-speed disks and their accessories in a dormant condition.

14 is an arm journaled on the carrying-hub of the friction-disk 7 aforesaid and having at its outer or free end an elongated radial opening or slideway 15, in which a journal-box 16 has movement.

17 is a friction roller or pinion journaled, by means of a lateral hub 18, in the journal-box 16 aforesaid and formed with an axial bore for the reception of the operating-lever hereinafter described. Such friction-roller is located in adjacent relation to the face of the driving friction-disk 5 and to the periphery of the driven friction-disk 7 and normally out of contact with said disks.

19 is a lever journaled on a fixed portion of the mechanism and passing through the axial bore of the friction-roller 17 to have operative engagement therewith, and so that when said lever is manually depressed the roller 17 is forcibly moved into contact with both friction-disks. Such operation is adapted to effect a reverse drive of the driven shaft, and as a preliminary thereto the friction-disks 5 and 7 will be moved out of direct frictional engagement, preferably by an axial adjustment of the driving friction-disk 5 upon its shaft, by the means heretofore described.

While in the drawings I illustrate my invention applied to a variable-speed mechanism of the friction-disk type, it is evident that the same could be used in the ordinary and equivalent friction-cone type of changeable-speed gearing, and the scope of the present invention accordingly embraces such change or substitution.

Having thus fully described my said invention, what I claim as new, and desire to secure by Letters Patent, is—

1. In a variable-speed mechanism of the friction-drive type, the combination of a power-shaft, a friction-drive member carried by the power-shaft, an adjustable friction-driven member, a counter-shaft carrying the same, a driven shaft in axial alinement with the power-shaft, a pair of bevel-gears connecting the counter-shaft and driven shaft, the bevel-gear of the driven shaft having an axial adjustment on a non-circular portion of said shaft and provided with a clutch member at one end, a corresponding clutch member secured to the power-shaft, and means for moving the bevel-gear and clutch member of the driven shaft out of mesh with the bevel-gear of the counter-shaft and into clutch engagement with the power-shaft, and vice versa, substantially as set forth.

2. In a variable-speed mechanism of the friction-drive type, the combination of a power-shaft, a driving friction-disk carried by the power-shaft, a driven friction-disk adjustable to and from the axis of driving-disk a counter-shaft carrying said driven disk, a driven shaft in axial alinement with the power-shaft, a pair of bevel-gears connecting the counter-shaft and the driven shaft, the bevel-gear of the driven shaft having an axial adjustment on a non-circular portion of said shaft and provided with a clutch member at on end, a corresponding clutch member secured to the power-shaft, and means for moving the bevel-gear and clutch member of the driven shaft out of mesh with the bevel-gear of the counter-shaft and into clutch engagement with the power-shaft, and vice versa, substantially as set forth.

3. In a variable-speed mechanism of the friction-drive type, the combination of a power-shaft, a driving friction-disk carried by the power-shaft, a driven friction-disk adjustable to and from the axis of driving-disk, a counter-shaft carrying said driven disk, a driven shaft in axial alinement with the power-shaft, a pair of bevel-gears connecting the counter-shaft and the driven shaft, the bevel-gear of the driven shaft having an axial adjustment on a non-circular portion of said shaft and provided with a clutch member at one end, a corresponding clutch member secured to the power-shaft, means for moving the bevel-gear and clutch member of the driven shaft out of mesh with the bevel-gear of the counter-shaft and into clutch engagement with the power-shaft, and vice versa, a friction-roller formed with an axial bore and arranged in adjacent relation to the driving and driven disks, an arm mounted on the hub of the driven disk and having a slideway at its outer end for said friction-roller, and an adjusting-lever engaging in the axial bore of said friction-roller, substantially as set forth.

4. In a variable-speed mechanism of the friction-drive type, the combination of a power-shaft, a driving friction-disk carrried by the power-shaft, a driven friction-disk adjustable to and from the axis of the driving-disk, a counter-shaft carrying said driven disk, a driven shaft in axial alinement with the power-shaft, a pair of bevel-gears connecting the counter-shaft and the driven shaft, the bevel-gear of the driven shaft having an axial adjustment on a non-circular portion of said shaft and provided with a clutch member at one end, a corresponding clutch member secured to the power-shaft, means for moving the bevel-gear and clutch member of the driven shaft out of mesh with the bevel-gear of the counter-shaft and into clutch engagement with the power-shaft, and vice versa, a friction-roller formed with an axial bore and arranged in adjacent relation to the driving and driven disks, an arm mounted on the hub of the driven disk and having a slideway at its outer end for said friction-roller, and an adjusting-lever engaging in the axial bore of said friction-roller, the driving friction-disk having a limited axial adjustment on the power-shaft, substantially as set forth.

Signed at Sandwich, Illinois, this 1st day of January, 1907.

ROLLEN BLEITZ.

Witnesses:
C. L. STINSON,
L. BLEITZ.